US009549360B2

(12) United States Patent
Khawer et al.

(10) Patent No.: US 9,549,360 B2
(45) Date of Patent: Jan. 17, 2017

(54) USER EQUIPMENT ASSISTED HANDOVER IN LICENSED AND UNLICENSED FREQUENCY BANDS

(71) Applicants: Mohammad R. Khawer, Lake Hopatcong, NJ (US); Yigang Cai, Naperville, IL (US); Robert A. Soni, Randolph, NJ (US)

(72) Inventors: Mohammad R. Khawer, Lake Hopatcong, NJ (US); Yigang Cai, Naperville, IL (US); Robert A. Soni, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 71 days.

(21) Appl. No.: 14/607,803

(22) Filed: Jan. 28, 2015

(65) Prior Publication Data
US 2016/0219487 A1    Jul. 28, 2016

(51) Int. Cl.
| | | |
|---|---|---|
| *H04W 36/00* | (2009.01) | |
| *H04M 1/00* | (2006.01) | |
| *H04W 36/36* | (2009.01) | |
| *H04W 36/06* | (2009.01) | |
| *H04W 36/16* | (2009.01) | |
| *H04W 48/14* | (2009.01) | |
| *H04W 52/02* | (2009.01) | |

(Continued)

(52) U.S. Cl.
CPC ............ *H04W 36/36* (2013.01); *H04W 36/06* (2013.01); *H04W 36/16* (2013.01); *H04W 48/14* (2013.01); *H04W 52/0277* (2013.01); *H04W 8/24* (2013.01); *H04W 48/18* (2013.01)

(58) Field of Classification Search
None
See application file for complete search history.

(56) References Cited

U.S. PATENT DOCUMENTS

| 2007/0008925 A1 | 1/2007 | Dravida et al. |
| 2007/0129045 A1 | 6/2007 | Aerrabotu |

(Continued)

FOREIGN PATENT DOCUMENTS

| WO | 2013010005 | 1/2013 |
| WO | 2013113387 | 8/2013 |
| WO | 2014130446 | 8/2014 |

OTHER PUBLICATIONS

"3GPP Charging Applications—Protocol Aspects", 3GPP TS 32.299 V12.7.0, Section 6, Dec. 1, 2014, 37 pages.

(Continued)

*Primary Examiner* — Erika Washington
(74) *Attorney, Agent, or Firm* — Davidson Sheehan LLP

(57) ABSTRACT

A user equipment determines a set of licensed and unlicensed frequency bands that are available for wireless communication. The user equipment selects a first subset of the set as targets for a handover involving at least one unlicensed frequency band and transmits information indicating the first subset. A base station receives information indicating a first subset of a set of licensed and unlicensed frequency bands. The first subset are targets for a handover of user equipment involving at least one unlicensed frequency band. The base station selects a second subset based on the first subset and transmits information indicating the second subset.

16 Claims, 6 Drawing Sheets

(51) Int. Cl.
*H04W 8/24* (2009.01)
*H04W 48/18* (2009.01)

(56) References Cited

U.S. PATENT DOCUMENTS

| | | | |
|---|---|---|---|
| 2007/0213046 A1* | 9/2007 | Li | H04W 40/244 |
| | | | 455/425 |
| 2009/0209229 A1 | 8/2009 | Cai et al. | |
| 2010/0178919 A1 | 7/2010 | Deepak et al. | |
| 2010/0220687 A1* | 9/2010 | Reznik | H04W 36/005 |
| | | | 370/331 |
| 2010/0246506 A1 | 9/2010 | Krishnaswamy | |
| 2011/0294435 A1 | 12/2011 | Miller | |
| 2013/0040697 A1* | 2/2013 | Ekici | H04W 48/18 |
| | | | 455/552.1 |
| 2014/0141826 A1 | 5/2014 | Cordeiro | |
| 2014/0200036 A1 | 7/2014 | Egner et al. | |
| 2014/0293829 A1 | 10/2014 | Visuri et al. | |

OTHER PUBLICATIONS

"Functional Description", 3GPP TS 23.203 V13.2.0, Section 6, Dec. 1, 2014, 65 pages.

U.S. Appl. No. 14/607,790, filed Jan. 28, 2015, listing Mohammad R. Khawer et al. as inventors, entitled "Differential Charging for Data Usage in Licensed and Unlicensed Frequency Bands".

U.S. Appl. No. 14/631,310, filed Feb. 25, 2015, listing Mohammad R. Khawer, et al. as inventors, entitled "Network Support for Differential Charging for Data Usage in Licensed and Unlicensed Frequency Bands,".

International Search Report and Written Opinion correlating to PCT/US16/014242 dated Apr. 14, 2016, 13 pages.

Non-Final Office Action mailed Mar. 2, 2016 for U.S. Appl. No. 14/607,7901, 32 pages.

Non-Final Office Action mailed Mar. 2, 2016 for U.S. Appl. No. 14/631,310, 34 pages.

International Search Report and Written Opinion correlating to PCT/US2016/014224 dated Jun. 1, 2016, 15 pages.

International Search Report and Written Opinion correlating to PCT/US2016/018329 dated May 18, 2016, 11 pages.

Non-Final Office Action mailed Mar. 2, 2016 for U.S. Appl. No. 14/631,310, 21. pages.

Final Office Action mailed Aug. 17, 2016 for U.S. Appl. No. 14/631,310, 45 pages.

Final Office Action mailed Aug. 26, 2016 for U.S. Appl. No. 14/607,790, 46 pages.

\* cited by examiner

USER EQUIPMENT ASSISTED HANDOVER IN LICENSED AND UNLICENSED FREQUENCY BANDS

CROSS REFERENCE TO RELATED APPLICATIONS

This application is related to U.S. patent application Ser. No. 14/607,790, entitled "DIFFERENTIAL CHARGING FOR DATA USAGE IN LICENSED AND UNLICENSED FREQUENCY BANDS" and filed on even date herewith, the entirety of which is incorporated by reference herein.

BACKGROUND

Field of the Disclosure

The present disclosure relates generally to wireless communication systems and, more particularly, to licensed and unlicensed frequency bands in wireless communication systems.

Description of the Related Art

The demand for mobile wireless data has been growing at an exponential rate and is expected to continue to grow by many orders of magnitude in the coming years. Meeting the increasing demand will require a corresponding increase in the amount of spectrum available for wireless communication. The available spectrum can be increased by combining licensed frequency bands with unlicensed frequency bands. Unlicensed frequency bands are portions of the radiofrequency spectrum that do not require a license for use and may therefore be used by any device to transmit or receive radio frequency signals. For example, the Unlicensed National Information Infrastructure (UNII) is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. Unlicensed frequency bands can be contrasted to licensed frequency bands that are licensed to a particular service provider and may only be used for wireless communication that is authorized by the service provider. Different radio access technologies (RATs) may share portions of the unlicensed frequency bands. For example, radios that operate according to Long Term Evolution (LTE) standards defined by the Third Generation Partnership Project (3GPP) may share portions of the 5 GHz unlicensed frequency band with Wi-Fi radios that operate according to 802.11 standards defined by the Institute of Electronics and Electrical Engineers (IEEE).

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for user equipment assisted handover between licensed and unlicensed frequency bands. The method includes determining, at a user equipment, a set of licensed and unlicensed frequency bands that are available for wireless communication. The method also includes selecting, at the user equipment, a first subset of the set as targets for a handover involving at least one unlicensed frequency band. The method further includes transmitting, from the user equipment, information indicating the first subset.

In some embodiments a method is provided for handing over user equipment between licensed and unlicensed frequency bands using information provided by the user equipment. The method includes receiving, at a base station, information indicating a first subset of a set of licensed and unlicensed frequency bands. The members of the first subset are targets for a handover of user equipment involving at least one unlicensed frequency band. The method also includes selecting, at the base station, a second subset based on the first subset and transmitting, from the base station, information indicating the second subset.

In some embodiments, a non-transitory computer readable medium is provided embodying a set of executable instructions for supporting user equipment-assisted handover between licensed and unlicensed frequency bands. The set of executable instructions is to manipulate a processor to determine a set of licensed and unlicensed frequency bands that are available for wireless communication, select a first subset of the set as targets for a handover involving at least one unlicensed frequency band, and transmit information indicating the first subset.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Base stations in a wireless communication system may hand off user equipment between different licensed or unlicensed frequency bands or different RATs. For example, the base stations can collect measurement data from user equipment. The measurement data may indicate parameters such as strengths of signals received by the user equipment in the licensed or unlicensed frequency bands. The base station may then decide whether to hand off the user equipment between the licensed or unlicensed frequency bands based on the measurement data. However, the user equipment is excluded from the decision-making process and consequently the handover decision for unlicensed frequency bands may not reflect user preferences, which may lead the base station to make inappropriate handover decisions. For example, the base station may force the user equipment to hand off from a licensed LTE-L band to an unlicensed LTE-U band based on measurement data previously reported by the user equipment or handover policies previously configured by network and/or mobile user. However, the handover would require the user equipment to power up another radio to support LTE-U, which increases a drain on a battery in the user equipment and reduces the battery life. User equipment may prefer not to power up an additional radio if the charge on its battery is running low.

Handover decisions can be made more responsive to user preferences by allowing the user equipment to indicate a preferred subset of a set of licensed and unlicensed frequency bands for wireless communication with a base station. The user equipment and the base station may then use the preferred subset as a starting point to negotiate a final subset of the set of licensed and unlicensed frequency bands for wireless communication. Some embodiments of the user equipment can bypass, suspend, or mute data transmission in response to the base station indicating that one or more frequency bands in the preferred subset is not available. The user equipment may select the preferred subset based on tariffs for the licensed and unlicensed frequency bands. Some embodiments of the user equipment also select the preferred subset based on a battery life of a battery in the user equipment. For example, the user equipment may include carriers in unlicensed frequency bands such as LTE-U or Wi-Fi in the preferred subset as long as the battery life exceeds a threshold, but may remove one or more of the unlicensed frequency bands from the preferred subset when the battery life falls below the threshold. In some embodiments, the user equipment ranks the bands in the preferred subset to indicate how well the different bands in the preferred subset satisfy selection criteria such as tariffs, effect on battery life, and the like. User input may be solicited using an interface supported by the user equipment, which can then select the preferred subset based on the user input.

Figure 1:
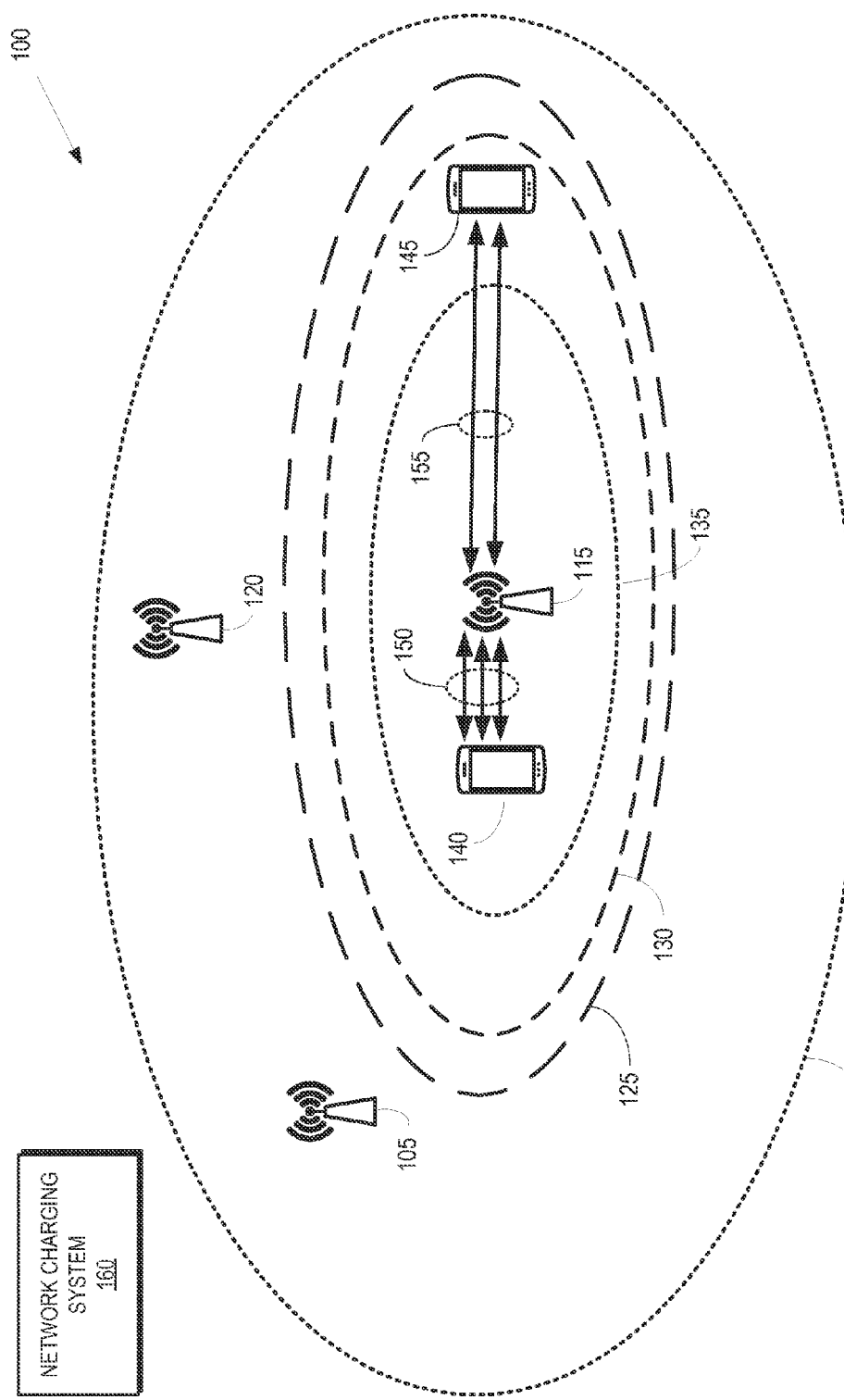
FIG. 1 is a diagram of a wireless communication system according to some embodiments.

FIG. 1 is a diagram of a wireless communication system 100 according to some embodiments. The wireless communication system 100 includes one or more macrocellular eNodeBs 105 that provide wireless connectivity according to a first radio access technology, e.g., according to the Long Term Evolution (LTE) standards defined by the Third Generation Partnership Project (3GPP). The eNodeB 105 provides wireless connectivity within a first geographical area or cell 110. The wireless communication system 100 also includes one or more small cells 115, 120 that provide wireless connectivity in geographic areas (or cells) 125, 130, 135 that partially or completely overlap with the macrocell 110. In the interest of clarity, the geographic areas served by the small cell 120 are not indicated by ovals in FIG. 1. As used herein, the term "base station" may be used to indicate eNodeBs that are part of a macrocellular network or small cells that overlay the macrocellular network. Small cells may also be referred to as home base station routers, metrocells, microcells, picocells, femtocells, and the like.

The small cells 115, 120 include (or are associated with) functionality that supports wireless communication according to multiple radio access technologies. For example, the small cells 115, 120 may include radios that support wireless communication according to LTE standards and Wi-Fi radios that support wireless communication according to 802.11 standards developed by the IEEE. The functionality for the multiple radio access technologies may be integrated into a single device or may be implemented in co-located devices. For example, the small cells 115, 120 may be integrated devices that include both the LTE radios and Wi-Fi radios or the small cells 115, 120 may include an LTE small cell that is co-located with a Wi-Fi access point. In either case, the term "small cell" will be understood to encompass the integrated or co-located devices that are used to support wireless communication according to the multiple radio access technologies.

The small cell 115 supports uplink or downlink communications over carriers in a licensed frequency band within the cell indicated by the dashed oval 125. The carriers in the licensed frequency band may be referred to as LTE licensed (LTE-L) carriers. The small cell 115 also supports wireless connectivity according to a first radio access technology such as LTE over carriers in one or more unlicensed frequency bands within a cell indicated by the dashed oval 130. The carriers in the unlicensed frequency band may be referred to as LTE unlicensed (LTE-U) carriers. The small cell 115 may also support wireless connectivity according to a second radio access technology such as Wi-Fi over carriers in one or more unlicensed frequency bands within a cell indicated by the dashed oval 135. The unlicensed carriers may be referred to as Wi-Fi carriers. The unlicensed frequency bands may include the Unlicensed National Information Infrastructure (UNII), which is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. The unlicensed frequency bands may also include a 2.4 GHz frequency band. The small cell 120 also supports wireless connectivity according to multiple radio access technologies in licensed and unlicensed frequency bands, e.g., according to the LTE standards or 802.11 standards.

The small cells 115, 120 allocate different transmission powers to different radios that support communication in the licensed and unlicensed frequency bands according to the different radio access technologies. Some embodiments of the small cells 115, 120 transmit relatively high power signals in the licensed frequency band, a midrange power in the LTE-U frequency band, and relatively lower power signals in the Wi-Fi unlicensed frequency band. Consequently, the cell 125 is larger than the cell 130, which is in turn larger than the cell 135. However, some embodiments of the small cells 115, 120 may allocate different relative powers to transmission in the different frequency bands, which may lead to a corresponding difference in the relative sizes of the cells 125, 130, 135.

Different sets of carriers in the licensed and unlicensed frequency bands are available to different user equipment 140, 145 depending on their location relative to the small cells 115, 120. For example, the user equipment 140 is within the boundaries of the cells 125, 130, 135 and consequently a set 150 of carriers operating according to the multiple radio access technologies (e.g., LTE-L, LTE-U, and Wi-Fi) supported by the small cell 115 are available to the user equipment 140. For another example, the user equipment 145 is within the boundaries of the cells 125, 130 but the user equipment 145 is outside the boundary of the cell 135. A set 155 of carriers operating according to some of the radio access technologies (e.g., LTE-L and LTE-U) is therefore available to the user equipment 145. One or more carriers supported by the small cell 120 may also be included in the sets 150, 155, although these additional carriers are not illustrated in the interest of clarity.

The unlicensed carriers in the sets 150, 155 may operate in different operating modes. For example, the small cell 115 may implement a supplemental downlink carrier in the unlicensed frequency band according to LTE-U. The supplemental downlink carrier is used to carry best effort downlink data from the small cell 115 to the user equipment 140, 145.

A primary carrier is anchored in the licensed frequency band (LTE-L) and is used to carry control data for the supplemental downlink carrier, as well as uplink data from the user equipment 140, 145 to the small cell 115. For another example, the small cell 115 may implement a carrier aggregation mode in which a secondary carrier in the unlicensed frequency band carries both uplink and downlink best effort data. A primary carrier is anchored in the licensed frequency band and is used to carry control data for the secondary carrier. Carrier grade Wi-Fi may be used to convey control, uplink, and downlink signals between the small cell 115 and the user equipment 140 over carriers in the unlicensed frequency band.

Data usage tariffs may differ for data transmitted in the licensed frequency bands and data transmitted in the unlicensed frequency bands. The wireless communication system 100 can therefore be configured to support differential charging for wireless data transmitted over licensed frequency bands and unlicensed frequency bands. Data usage tariffs and charging policies may be generated by a network charging system 160 such as an LTE core network policy and charging control entity. The charging policies may include an expiration timer that is used to indicate a valid duration of the charging policy.

User equipment 140, 145 can be handed off between the licensed and unlicensed carriers in the sets 150, 155. The handoffs may involve the carriers in the unlicensed frequency bands. For example, the user equipment 140 may initially establish uplink or downlink communication with the small cell 115 in the licensed frequency band using an available LTE-L carrier. Data traffic, such as downlink best effort traffic, may subsequently be handed off to a carrier in the unlicensed frequency band such as an LTE-U carrier or a Wi-Fi carrier. For another example, data traffic that is being provided to the user equipment 140 on a carrier in the unlicensed frequency band may be handed off from the unlicensed frequency band to a carrier in the licensed frequency band. For yet another example, data traffic that is being provided to the user equipment 140 on a first carrier in the unlicensed frequency band (e.g., a Wi-Fi carrier) may be handed off to a second carrier in the unlicensed frequency band (e.g., an LTE-U carrier). The user equipment 140, 145 may also be handed off between licensed and unlicensed frequency bands supported by different small cells 115, 120.

Some embodiments of the user equipment 140, 145 assist the handover process by selecting a subset of the set of available carriers as targets for a subsequent handover. The selection may be performed based on data usage tariffs for the set of licensed and unlicensed frequency, a battery level of a battery in the user equipment, or other criteria such as measured parameters of signals received in the licensed or unlicensed frequency bands. The user equipment 140, 145 can then transmit information identifying the first subset to one of the small cells 115, 120. Some embodiments of the user equipment 140, 145 may also transmit other information such as rankings of the carriers in the subset or the measured parameters of the signals received in the licensed or unlicensed frequency bands. The small cells 115, 120 may use the information provided by the user equipment 140, 145 to identify a candidate subset of carriers in the licensed or unlicensed frequency bands for the handover. The candidate subset may include one or more of the carriers in the subset provided by the user equipment 140, 145. The user equipment 140, 145 and the small cell 115, 120 may then negotiate to determine a final target carrier for the handover.

Figure 2:
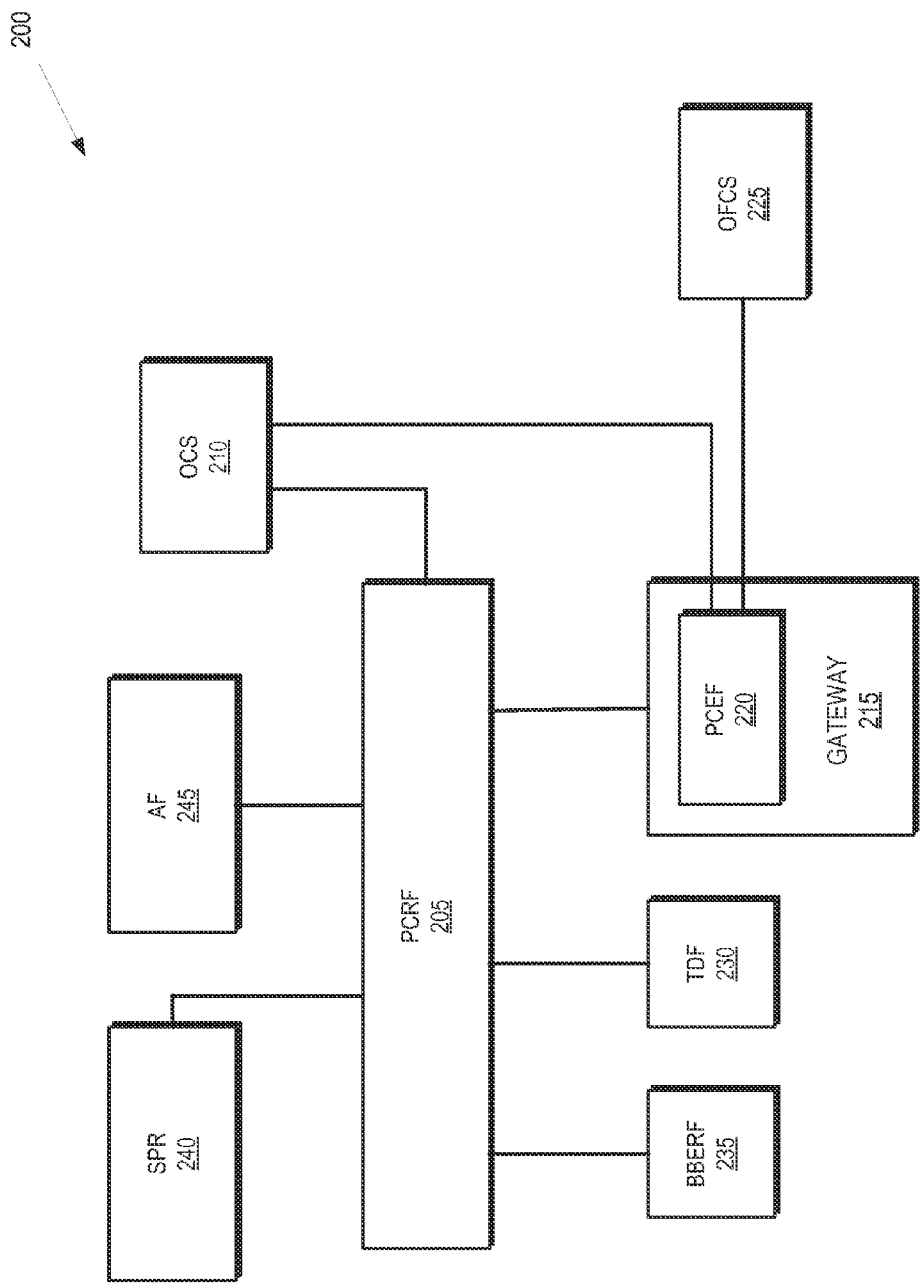
FIG. 2 is a block diagram of a network charging system according to some embodiments.

FIG. 2 is a block diagram of a network charging system 200 according to some embodiments. The network charging system 200 may be used to implement some embodiments of the network charging system 160 shown in FIG. 1. The architecture of the network charging system 200 may be defined according to the policy and charging control reference architecture defined by 3GPP TS 23.203, "Technical Specification Group Services and System Aspects, Policy and charging control architecture." However, other embodiments of the network charging system 200 may be defined according to other reference architectures.

The network charging system 200 includes a policy control and charging rules function (PCRF) 205 that performs policy control decision-making and flow based charging control. An online charging system (OCS) 210 can provide data usage tariffs or policies to the PCRF 205 to indicate the data usage tariffs for licensed and unlicensed frequency bands such as LTE-L, LTE-U, and Wi-Fi. The OCS 210 may provide the information in either a push mode (e.g., without a specific request from the PCRF 205) or a pull mode (e.g., in response to a request from the PCRF 205). The charging policies may be determined based on a subscriber's charging account or an account associated with a group of subscribers. The data usage tariff for the unlicensed frequency band may be much lower than the data usage tariff for the licensed frequency band. However, some embodiments of the OCS 210 may determine the data usage tariffs based on other factors such as network traffic, location of the user equipment, quality of service, and the like. Thus, the data usage tariff for the unlicensed frequency band may in some cases be higher than the data usage tariff for the licensed frequency band.

The network charging system 200 also includes a gateway 215 such as a serving gateway (SGW) or a mobility management entity (MME) that is connected to the PCRF 205. The gateway 215 may be used to support communication between the network charging system 200 and base stations, eNodeBs, small cells, and the like. The gateway 215 includes a policy and charging enforcement function (PCEF) 220 that performs dataflow detection, policy enforcement, and flow-based charging. The OCS 210 may be connected to the PCEF 220 to provide policy information used by the PCEF 220. An off-line charging system (OFCS) 225 is also included in the network charging system 200 and is connected to the PCEF 220 to provide policies for off-line charging.

A traffic detection function (TDF) 230 performs application detection and reporting of detected applications. The TDF 230 also provides service data flow descriptors to the PCRF 205. A bearer binding and event reporting function (BBERF) 235 is used to perform bearer binding and binding verification, as well as providing event reporting to the PCRF 205. A subscription profile repository (SPR) 240 contains all subscriber/subscription related information needed for subscription-based policies. The SPR 240 also stores information indicating IP-CAN bearer level rules used by the PCRF 205. An application function (AF) 245 offers applications that may require dynamic policy or charging control. The AF 245 can communicate with the PCRF 205 to transfer dynamic session information to the PCRF 205.

Some embodiments of the PCRF 205 are configured to provide charging policies to base stations such as the small cells 115, 120 shown in FIG. 1. The PCRF 205 may generate the charging policies based on conditions in the base station such as conditions that may be detected by the TDF 230. The PCRF 205 may provide the charging policies to the base station during establishment of the IP-CAN bearers between the base station and user equipment (such as the user equipment 140, 145 shown in FIG. 1). For example, the PCRF 205 may provide the charging policies to the gateway 215, which may forward the charging policies to an eNodeB (such as the eNodeB 105 shown in FIG. 1) for transmission to the base station. The gateway 215 may also provide the charging policies directly to the base station in some embodiments. The PCRF 205 may statically configure the base stations based on information provided by the service providers or the base stations may be dynamically configured. The base station may therefore receive Advance-of-Charging information from the network charging system 200 for wireless communication in licensed and unlicensed frequency bands.

Data usage tariffs or charging policies may also be provided to user equipment, such as the user equipment 140, 145 shown in FIG. 1. The network charging system 200 may provide the data usage tariffs or charging policies in a pull mode (e.g., in response to a request from the user equipment) or in a push mode (e.g., without a request from the user equipment). The user equipment may use the data usage tariffs or charging policies to select a subset of carriers in the licensed or unlicensed frequency bands as candidates for handover. The data usage tariffs or charging policies may also be used to determine the subset of candidate target carriers in conjunction with other information such as a battery level of a battery in the user equipment or parameters of signals measured by the user equipment.

Figure 3:
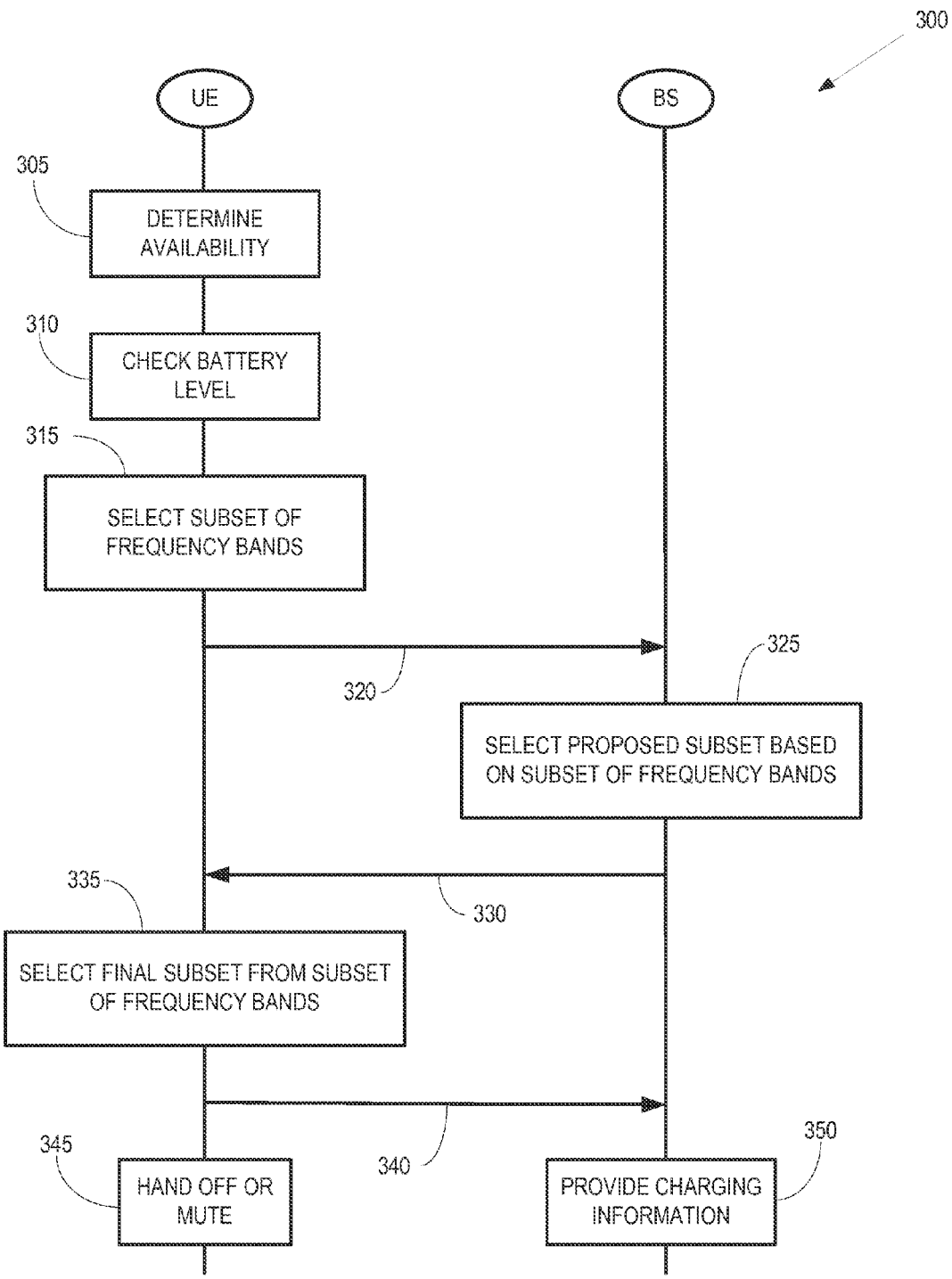
FIG. 3 is a flow diagram of a method for user equipment assisted handover involving unlicensed frequency bands according to some embodiments.

FIG. 3 is a flow diagram of a method 300 for user equipment assisted handover involving unlicensed frequency bands according to some embodiments. The method 300 may be implemented in some embodiments of the user equipment 140, 145 shown in FIG. 1.

At block 305, the user equipment determines availability of one or more carriers in licensed and unlicensed frequency bands. The user equipment can determine the availability of the carriers by detecting signal such as pilot signals or beacon signals transmitted by one or more base stations in the licensed and unlicensed frequency bands. For example, the user equipment can detect the availability of a carrier by measuring a signal strength of a pilot signal transmitted in the corresponding frequency band and determining that the signal strength exceeds a detection threshold. The available carriers may be supported by a single base station or multiple base stations. At block 310, the user equipment checks the battery level of the battery that provides power to the user equipment. The user equipment may also compare the battery level to one or more thresholds to determine whether sufficient power remains in the battery to power radios used for communication in the licensed and unlicensed frequency bands. The user equipment can also estimate a battery drain rate that results from operation of different combinations of the radios, e.g., based on the power settings determined by the channel conditions associated with the radios. The battery level and the battery drain rate can be used to estimate or predict a battery lifetime.

At block 315, the user equipment selects a subset of the available carriers in the licensed and unlicensed frequency bands. The subset of the available carriers may indicate potential targets for hand off of the user equipment. Some embodiments of the user equipment select the subset of the available carriers based on the battery level of the battery in the user equipment. For example, the user equipment may select all of the available carriers if the battery level is above a first threshold so that sufficient power is available to provide power to the corresponding radios. The battery drain rate or battery lifetime can also be used as a selection criterion for determining the subset of the available carriers. Some embodiments of the user equipment select the subset of the available carriers based on data usage tariffs associated with the carriers in the licensed and unlicensed frequency bands. The user equipment may also use other criteria such as measured values of signal strength or channel quality conditions associated with the available carriers, signal-to-noise ratios, a speed of the user equipment, security considerations, energy efficiency, location of the user equipment, or service provider ownership of the base station. In various embodiments, the criteria described herein may be used in any combination to select the subset. The subset may be selected automatically by the user equipment or may be selected based upon user input, as discussed herein.

The user equipment transmits (at 320) information indicating the subset of the available carriers to a base station such as one of the small cells 115, 120 shown in FIG. 1. The information may also include information indicating a ranking of the carriers in the subset. For example, the user equipment may rank the carriers in order from lowest data usage tariff to highest data usage tariff, from highest channel quality to lowest channel quality, or according to a priority determined by a combination of these or other parameters. The transmitted information may also include other information such as values of measured parameters of signals received by the user equipment and the like. Available carriers that do not meet the selection criteria implemented by the user equipment may not be reported to the base station.

At block 325, the base station selects a proposed subset based on the subset received from the user equipment. The proposed subset may include some, all, or none of the carriers indicated in the subset received from the user equipment, as well as other carriers that are not indicated in the subset received from the user equipment. Some embodiments of the base station select the proposed subset based on criteria for security, energy efficiency, load-balancing, bandwidth, location of the user equipment, speed of the user equipment, or subscriber data such as charging rules or data usage tariffs.

The base station transmits (at 330) information indicating the proposed subset to the user equipment. Some embodiments of the base station transmit information indicating a single target carrier for hand off of the user equipment to the target carrier. The base station may therefore also transmit a handover command to the user equipment. Some embodiments of the base station transmit information indicating multiple target carriers for hand off of the user equipment. Additional information such as quality-of-service levels, data usage tariffs, or charging policies may be transmitted with the information indicating the multiple target carriers so that the user equipment has additional information to use to select a final target carrier.

At block 335, the user equipment selects a final subset from the proposed subset received from the base station. If the base station indicated a single target carrier, then the user equipment decides whether to accept the hand off to the target carrier. If the base station indicated multiple target carriers, the user equipment selects one or more of the target carriers for hand off. The selection in this case may also be based on the additional information provided by the base station. The user equipment transmits (at 340) confirmation of the final subset selected by the user equipment. In some embodiments, the user equipment and the base station can iteratively negotiate the final subset of target carriers. For example, the actions 320, 325, 330, 335, and 340 may be iteratively repeated until the user equipment and the base station agree on the final subset of target carriers.

At block 345, the user equipment performs a handoff to the one or more target carriers. In some cases, the proposed subset provided to the user equipment by the base station may not include any of the target carriers indicated in the subset initially selected by the user equipment. Some embodiments of the user equipment may therefore mute (at block 345) wireless communication with the base station if none of the preferred target carriers indicated in the initial subset are found in the subset proposed by the base station.

At block 340, the base station generates charging information associated with a source carrier or the target carrier and provides the charging information to a network charging system such as the network charging system 165 shown in FIG. 1 or the network charging system 200 shown in FIG. 2. The charging information may include information identifying the user equipment connections over the licensed or unlicensed frequency bands such as LTE-L for a macrocell, LTE-L for a metrocell or other small cell, LTE-U for a metrocell or other small cell, or carrier grade Wi-Fi. The charging information may also include information indicating the status of the user equipment, a quality-of-service for communication with the user equipment, a location of the user equipment, ownership of a small cell, security, or other charging related measurement parameters. Upon receipt of the charging information, the network charging system can estimate rates for the communication based on charging rules or rates and information in the subscriber account. The network charging system may provide estimated data usage tariffs to the base station, which may feed the estimates back to the user equipment.

Figure 4:
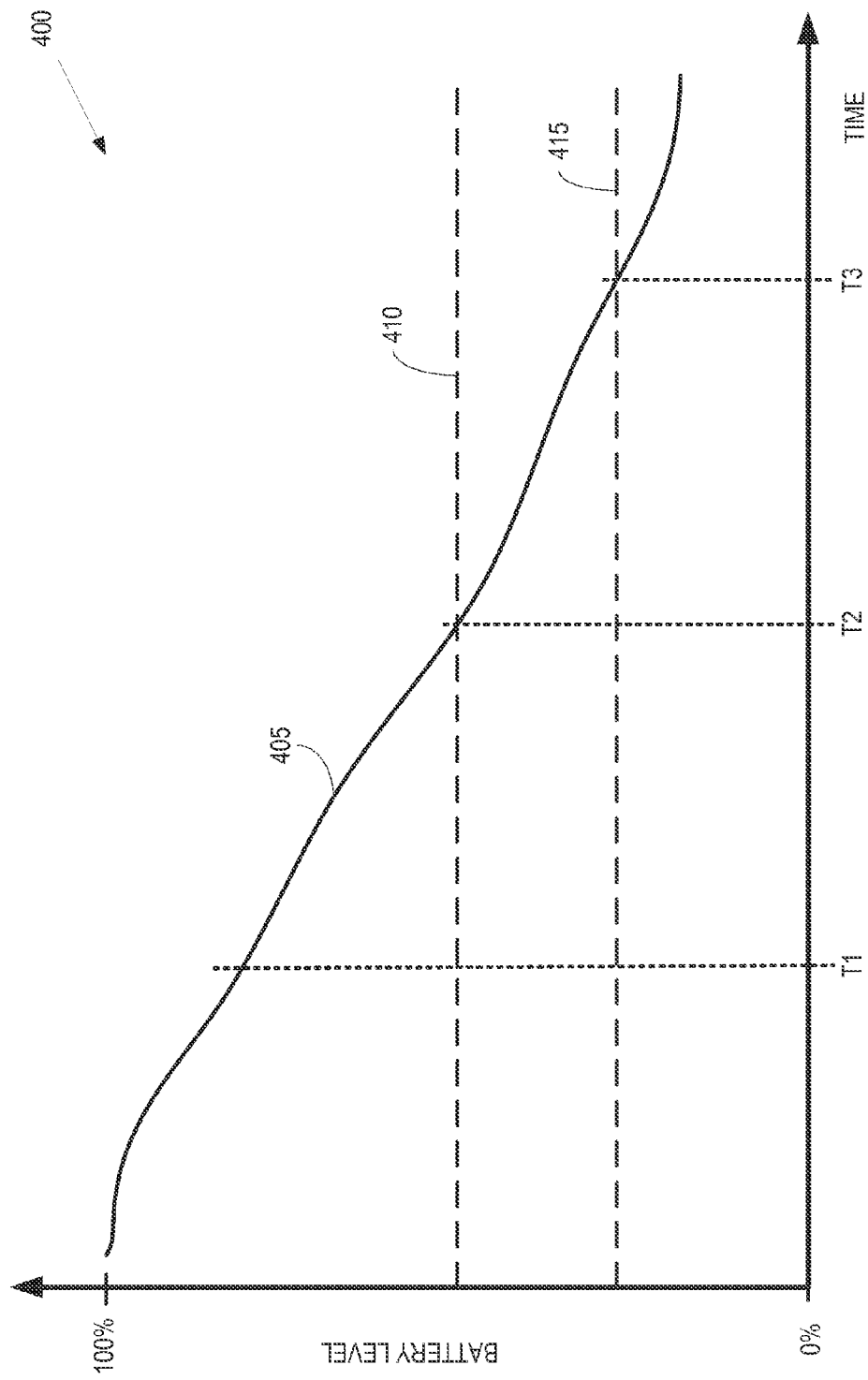
FIG. 4 is a plot of a battery level of a battery in user equipment according to some embodiments.

FIG. 4 is a plot 400 of a battery level of a battery in user equipment according to some embodiments. The vertical axis indicates a charging or power level of a battery as a percentage of a full charge or power level of the battery. The horizontal axis indicates time in arbitrary units increasing from left to right. User equipment such as the user equipment 140, 145 shown in FIG. 1 may measure a battery level 405 as part of a method for selecting target carriers in licensed or unlicensed frequency bands, as discussed herein.

At time T1, the user equipment measures the battery level 405 and determines that it is above a first threshold 410, which indicates that there is sufficient power to operate multiple radios in the user equipment. For example, battery levels above the first threshold 410 may indicate that there is sufficient power to operate radios for LTE-L, LTE-U, and Wi-Fi. The user equipment may therefore use this information to select a subset of carriers that include carriers supported by the multiple radios.

At time T2, the user equipment measures the battery level 405 and determines that it is below the first threshold 410, which indicates that there is not sufficient power to operate all the radios in the user equipment. However, the measured battery level 405 is above the second threshold 415, which indicates that there is sufficient power to operate a radio in the licensed frequency band and a radio in the unlicensed frequency band. For example, the measured battery level 405 may indicate that there is sufficient power to operate an LTE-L radio and either the LTE-U radio or the Wi-Fi radio. One of the radios may be left on to support communication in the unlicensed frequency band and the other radio may be turned off to conserve battery power. The user equipment may use this information to select a subset of carriers that includes carriers supported by the radio in the licensed frequency band and a radio in the unlicensed frequency band. For example, the user equipment may select carriers in the LTE-L licensed frequency band and the LTE-U unlicensed frequency band, while turning off the Wi-Fi radio to conserve power.

At time T3, the user equipment measures the battery level 405 and determines that it is below the first threshold 415, which indicates that there is not sufficient power to operate the radios that support communication in the unlicensed frequency bands. The user equipment may therefore turn off the radios that are used for communication in unlicensed frequency bands. For example, the user equipment may turn off the LTE-U radio and the Wi-Fi radio. The user equipment may also select a subset that only includes carriers in the licensed frequency bands supported by the LTE-L radio.

In some embodiments, the battery level 405 is also used to trigger handovers involving the unlicensed frequency bands. For example, a handover between two unlicensed frequency bands may be triggered if the user equipment determines that the battery level 405 falls below the threshold 410 while the user equipment is receiving best effort communication from a base station in the unlicensed frequency bands. Handover of the user equipment from one of the unlicensed frequency bands (to either a licensed frequency band or another unlicensed frequency band) may allow the user equipment to turn off a radio that supports the unlicensed frequency band to conserve power. For another example, a handover from an unlicensed frequency band to a licensed frequency band may be triggered if the user equipment determines that the battery level 405 falls below the threshold 410 while it is receiving best effort communication from the base station in the unlicensed frequency band. One of the radios for communication in an unlicensed frequency band may already have been turned off, as discussed herein. Handover of the user equipment from the unlicensed frequency band to the licensed frequency band may allow the user equipment to turn off another radio, thereby conserving additional power.

Figure 5:
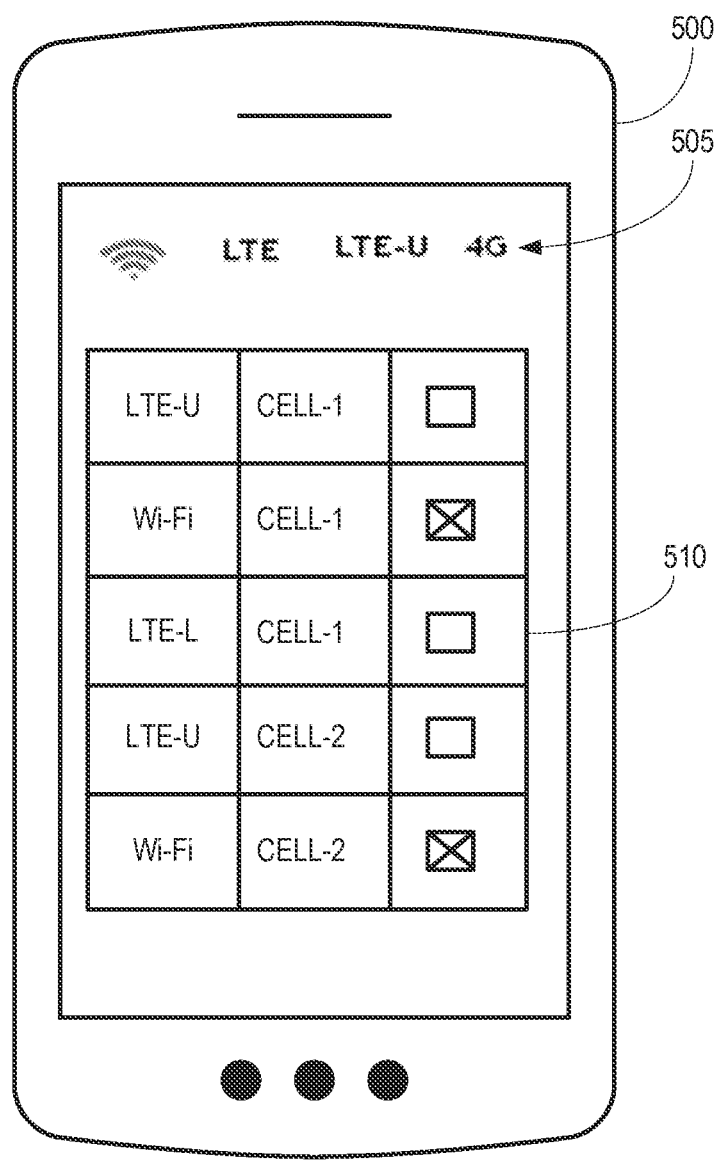
FIG. 5 is a block diagram of a user equipment according to some embodiments.

FIG. 5 is a block diagram of a user equipment 500 according to some embodiments. The user equipment 500 may be used to implement some embodiments of the user equipment 140, 145 shown in FIG. 1. The user equipment 500 displays indicators 505 for the available access types, such as Wi-Fi, LTE, LTE-U, and 4G. The user equipment 500 also includes an interface 510 that allows a user to view, configure, or provide input to the selection algorithm implemented in the user equipment 500. The selection algorithm may then be used to select the subsets of available carriers and negotiate target carriers for handoff, as discussed herein. For example, the interface 510 displays the carriers available in the licensed and unlicensed frequency bands in a first column and the identity of the base station (Cell-1, Cell-2) that supports the available carriers. Some embodiments of the interface 510 may also display or provide access to additional information associated with the available carriers such as indications of quality-of-service or best effort communication, data usage tariffs, channel quality, and the like.

The third column in the interface 510 indicates the subset of carriers selected as potential target carriers for handover of the user equipment 500. The carriers associated with unchecked boxes are included in the subset of carriers and the carriers associated with checked boxes are not included in the subset of carriers. In some embodiments, user input may be used to select the subset of carriers. For example, the user equipment 500 may include a touchscreen and a user may tap one of the boxes in the third column of the interface 510 to select or unselect the corresponding carrier.

Figure 6:
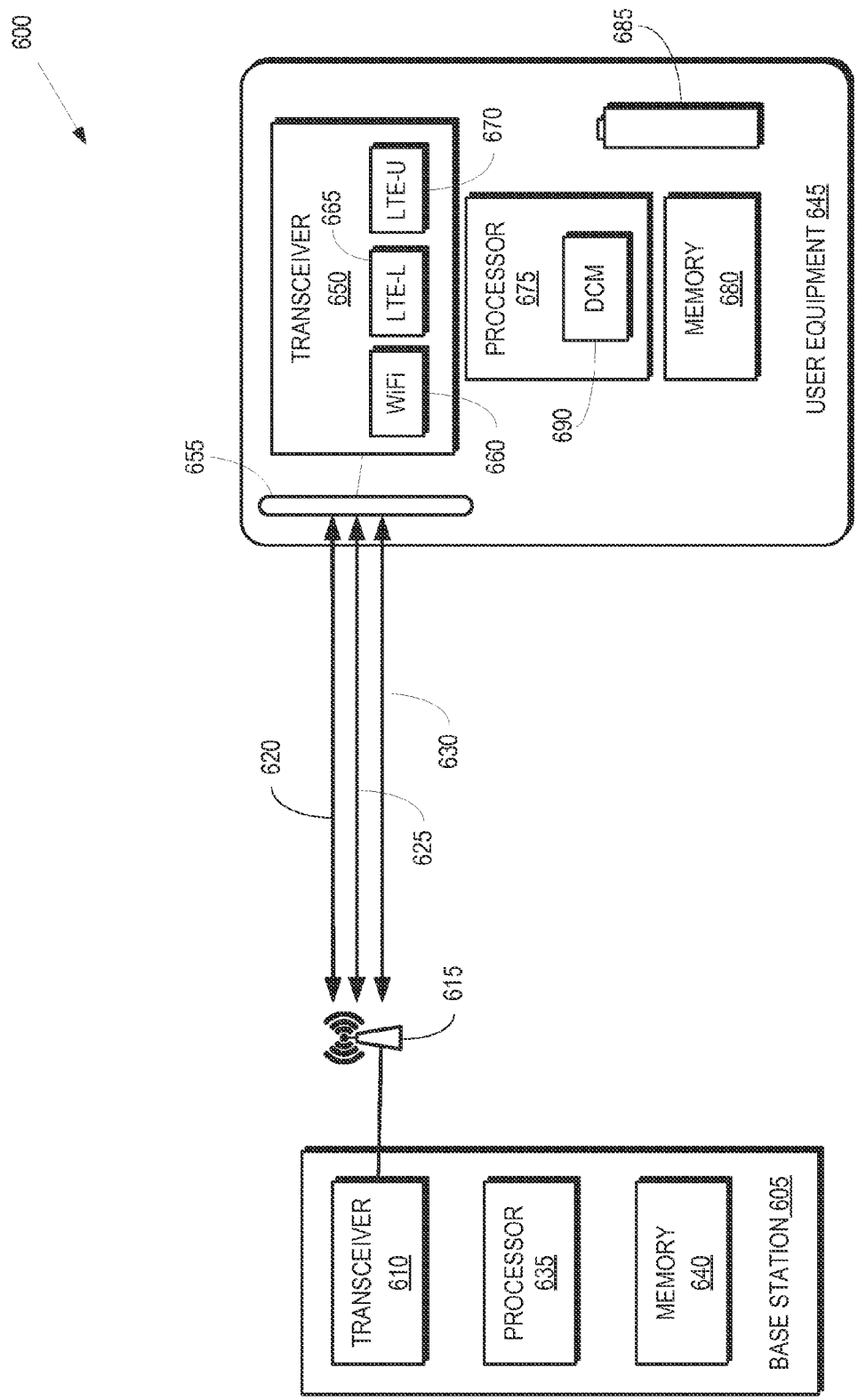
FIG. 6 is a block diagram of a wireless communication system according to some embodiments.

FIG. 6 is a block diagram of a communication system 600 according to some embodiments. The communication system 600 includes a base station 605 that operates according to multiple radio access technologies. For example, the base station 605 may be an integrated device that implements LTE communication and a Wi-Fi access point. For another example, the base station 605 may be representative of co-located devices that support LTE communication and a Wi-Fi access point. Some embodiments of the base station 605 may be used to implement the small cells 115, 120 shown in FIG. 1. The base station 605 includes a transceiver 610 for transmitting and receiving signals using one or more antennas 615. The signals may include uplink or downlink signals transmitted over an LTE-L carrier 620 in a licensed frequency band, over an LTE-U carrier 625 in an unlicensed frequency band, or over a Wi-Fi carrier 630 in an unlicensed frequency band. The carriers 620, 625, 630 may be aggregated to increase the total bandwidth provided by the base station 605. The LTE base station 605 also includes a processor 635 and a memory 640. The processor 635 may be used to execute instructions stored in the memory 640 and to store information in the memory 640 such as the results of the executed instructions. Some embodiments of the processor 635 and the memory 640 may be configured to perform portions of the method 300 shown in FIG. 3.

The communication system 600 includes user equipment 645. The user equipment 645 includes a transceiver 650 for transmitting and receiving signals via antenna 655. Some embodiments of the transceiver 650 include multiple radios for communicating according to different radio access technologies such as a Wi-Fi radio 660, a radio 665 for communication in licensed LTE frequency bands (LTE-L), and a radio 670 for communication in unlicensed LTE frequency bands (LTE-U). For example, the LTE-L radio 665 in the user equipment 645 may communicate with the base station 605 using the LTE-L carriers 620 in the licensed frequency band. The LTE-U radio 670 in the user equipment 645 may communicate with the base station 605 using the LTE-U carriers 625 in the unlicensed frequency band. The user equipment 645 may also communicate with the (integrated or co-located) Wi-Fi access point in the base station 605 using the Wi-Fi radio 660 in the user equipment 645.

The user equipment 645 also includes a processor 675, a memory 680, and a battery 685 to provide power to the user equipment 645. The processor 675 may be used to execute instructions stored in the memory 680 and to store information in the memory 680 such as the results of the executed instructions. Some embodiments of the processor 675, the memory 680, and the battery 685 may be configured to perform portions of the method 300 shown in FIG. 3. For example, the processor 675 may implement a device connection manager (DCM) 690 to operation of the transceiver 650 and the radios 660, 665, 670. The DCM 690 may selectively activate, deactivate, or reactivate one or more of the radios 665, 670 that operate in the unlicensed frequency band, as discussed herein. Some embodiments of the DCM 690 may perform the selective activation, deactivation, or reactivation based on battery levels, a battery drain rate, or a battery lifetime of the battery 685.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining, at a user equipment, a set of licensed and unlicensed frequency bands that are available for wireless communication;
   selecting, at the user equipment, a first subset of the set as targets for a handover involving at least one unlicensed frequency band, wherein selecting the first subset comprises selecting the first subset based on a battery level of a battery in the user equipment, and wherein selecting the first subset based on the battery level comprises selecting at least one unlicensed frequency band supported by a first radio that operates according to a first radio access technology and powering down a second radio that operates according to a second radio access technology in response to the battery level being below a first threshold; and transmitting, from the user equipment, information indicating the first subset.

2. The method of claim 1, wherein selecting the first subset comprises selecting the first subset based on data usage tariffs for the set of licensed and unlicensed frequency bands.

3. The method of claim 1, wherein selecting the first subset based on the battery level comprises selecting at least one licensed frequency band and powering down the first radio and the second radio in response to the battery level being below a second threshold that is lower than the first threshold.

4. The method of claim 1, wherein selecting the first subset comprises ranking the licensed or unlicensed frequency bands in the first subset based on at least one of data usage tariffs for the first subset, estimated battery drains associated with the first subset, a battery level of a battery in the user equipment, and measurement data for signals received in the licensed and unlicensed frequency bands.

5. The method of claim 1, wherein selecting the first subset comprises selecting the first subset based on user input provided to the user equipment.

6. A method comprising:
determining, at a user equipment, a set of licensed and unlicensed frequency bands that are available for wireless communication,
selecting, at the user equipment, a first subset of the set as targets for a handover involving at least one unlicensed frequency band;
transmitting, from the user equipment, information indicating the first subset;
receiving a second subset in response to transmitting the information indicating the first subset; and
negotiating a third subset in response to receiving the second subset.

7. The method of claim 6, further comprising:
muting data transmission from the user equipment in response to the second subset not including any licensed or unlicensed frequency bands in the first subset.

8. The method of claim 6, further comprising:
handing off the user equipment to at least one licensed or unlicensed frequency band in the third subset.

9. A method comprising:
receiving, at a base station, information indicating a first subset of a set of licensed and unlicensed frequency bands, wherein the first subset are targets for a handover of user equipment involving at least one unlicensed frequency band, wherein receiving the information indicating the first subset comprises receiving information indicating a ranking of the licensed or unlicensed frequency bands in the first subset;
selecting, at the base station, a second subset based on the first subset, wherein selecting the second subset comprises selecting the second subset based on the ranking so that licensed or unlicensed frequency bands with a higher ranking are preferentially selected for the second subset over licensed or unlicensed frequency bands with a lower ranking, and wherein selecting the second subset comprises determining a different ranking for the licensed or unlicensed frequency bands in the second subset than the ranking associated with the first subset; and transmitting, from the base station, information indicating the second subset.

10. The method of claim 9, wherein selecting the second subset based on the first subset comprises selecting the second subset based on indicators of at least one of security, energy efficiency, load-balancing, bandwidth, location of the user equipment, speed of the user equipment, charging rules, and data usage tariffs of the licensed and unlicensed frequency bands.

11. A method, comprising:
receiving, at a base station, information indicating a first subset of a set of licensed and unlicensed frequency bands, wherein the first subset are targets for a handover of user equipment involving at least one unlicensed frequency band;
selecting, at the base station, a second subset based on the first subset;
transmitting, from the base station, information indicating the second subset; and
requesting information indicating data usage tariffs for the licensed and unlicensed frequency bands, and wherein transmitting the information indicating the second subset comprises transmitting information indicating the data usage tariffs for the licensed and unlicensed frequency bands in the second subset.

12. A method, comprising:
receiving, at a base station, information indicating a first subset of a set of licensed and unlicensed frequency bands, wherein the first subset are targets for a handover of user equipment involving at least one unlicensed frequency band;
selecting, at the base station, a second subset based on the first subset;
transmitting, from the base station, information indicating the second subset; and
negotiating a third subset in response to transmitting the second subset.

13. The method of claim 12, further comprising:
handing off the user equipment to at least one licensed or unlicensed frequency band in the third subset.

14. A non-transitory computer readable medium embodying a set of executable instructions, the set of executable instructions to manipulate a processor to:
determine a set of licensed and unlicensed frequency bands that are available for wireless communication;
select a first subset of the set as targets for a handover involving at least one unlicensed frequency band, wherein selecting the first subset comprises selecting the first subset based on a battery level of a battery in a user equipment, and wherein selecting the first subset based on the battery level comprises selecting at least one unlicensed frequency band supported by a first radio that operates according to a first radio access technology and powering down a second radio that operates according to a second radio access technology in response to the battery level being below a first threshold; and
transmit information indicating the first subset.

15. The non-transitory computer readable medium of claim 14, wherein the set of executable instructions to manipulate the processor to:

select the first subset based on at least one of data usage tariffs for the set of licensed and unlicensed frequency bands and a battery level of a battery in the user equipment.

16. A non-transitory computer readable medium embodying a set of executable instructions, the set of executable instructions to manipulate a processor to:
- determine a set of licensed and unlicensed frequency bands that are available for wireless communication;
- select a first subset of the set as targets for a handover involving at least one unlicensed frequency band;
- transmit information indicating the first subset;
- receive a second subset in response to transmitting the information indicating the first subset; and
- negotiate a third subset in response to receiving the second subset.

* * * * *